United States Patent [19]

Willmsen

[11] Patent Number: 4,940,251
[45] Date of Patent: Jul. 10, 1990

[54] MARKER ASSEMBLY FOR A BOAT TRAILER

[76] Inventor: Vernon H. Willmsen, 2413 S. 95 St., West Allis, Wis. 53227

[21] Appl. No.: 191,037

[22] Filed: May 6, 1988

[51] Int. Cl.⁵ ............................................. B60P 3/10
[52] U.S. Cl. ................................. 280/414.1; 114/344; 116/229
[58] Field of Search .................. 114/343, 344; 441/89; 280/414.1, 414.2; 116/26, 109, 227, 228, 229

[56] References Cited

U.S. PATENT DOCUMENTS

| | | | |
|---|---|---|---|
| 2,594,885 | 4/1952 | Due | 116/229 |
| 2,744,411 | 5/1956 | Spencer | 116/229 |
| 2,897,853 | 8/1959 | Anstine | 116/229 |
| 3,447,815 | 6/1969 | West . | |
| 3,995,251 | 11/1976 | Jones | 116/229 |
| 4,011,958 | 3/1977 | Carrick . | |
| 4,197,050 | 4/1980 | Larson . | |
| 4,434,995 | 3/1984 | Toy | 114/344 |
| 4,529,217 | 7/1985 | Wood . | |
| 4,579,357 | 4/1986 | Webster | 114/344 |
| 4,623,161 | 11/1986 | Sprague . | |
| 4,714,914 | 12/1987 | Boe | 441/89 |

Primary Examiner—Sherman D. Basinger
Assistant Examiner—Stephen P. Avila
Attorney, Agent, or Firm—Foley & Lardner

[57] ABSTRACT

A marker assembly for a boat trailer according to the invention includes a marker pole, a reservoir or tank disposed at one end of the marker pole, and a bracket assembly for rotatably mounting the marker to a conventional boat trailer. The reservoir fills with water and is configured so that the marker pole is self-righting. The marker assembly according to the invention eliminates the need for manually righting the marker prior to backing the trailer into the water near a dock or similar structure.

6 Claims, 1 Drawing Sheet

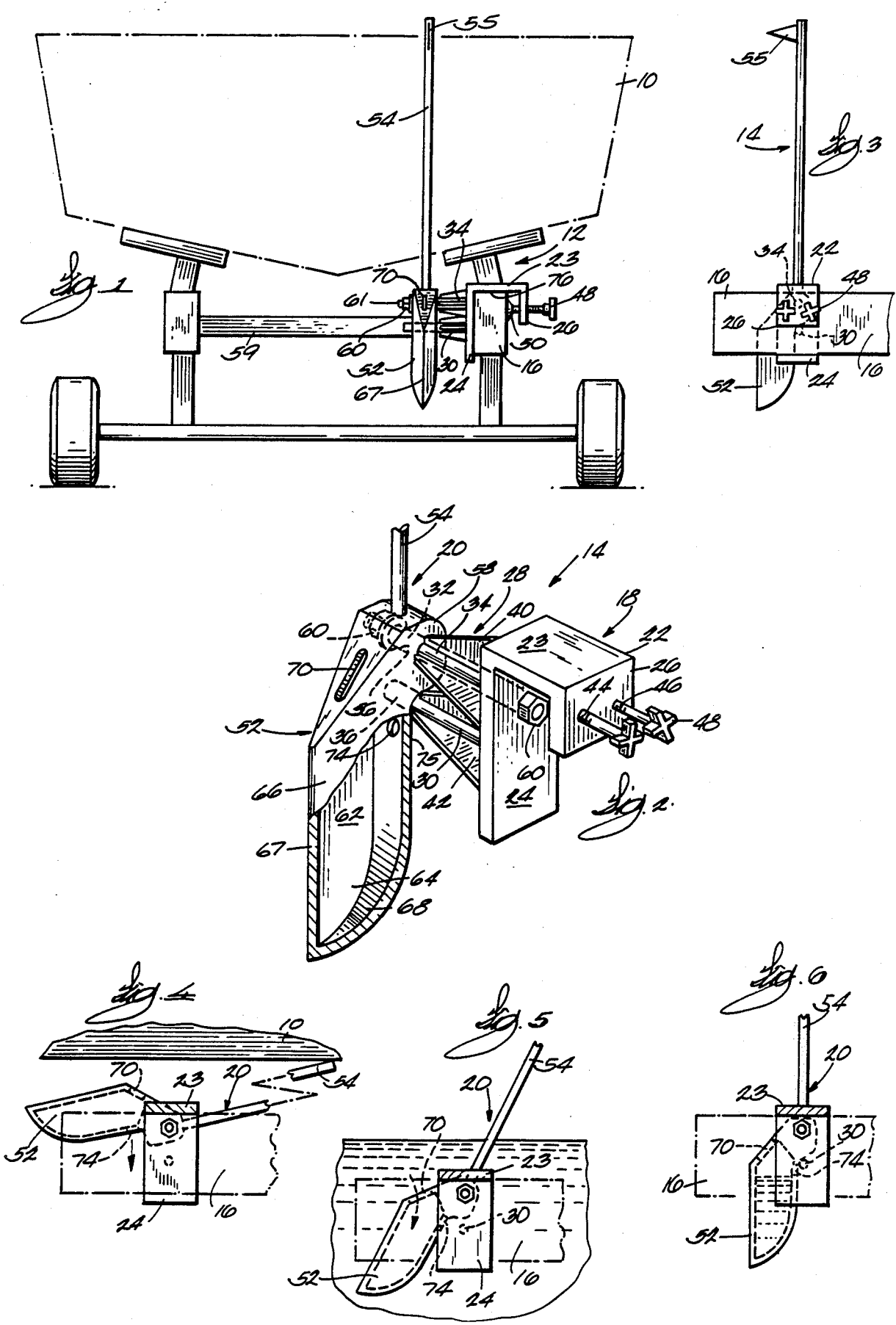

MARKER ASSEMBLY FOR A BOAT TRAILER

FIELD OF THE INVENTION

The present invention relates, in general, to a device for providing a visual indication of the proper positioning of an empty boat trailer with respect to a dock or the like to permit easy retrieval of the boat from a body of water.

BACKGROUND OF THE INVENTION

Boat trailer guiding devices for use in launching and later retrieving boats are, in general, known. An example of such a device is described in U.S. Pat. No. 4,197,050, issued Apr. 8, 1980, to Larson, which exemplifies an apparatus for centering the hull of a boat on a boat trailer during launching and loading of the boat. The assembly includes, inter alia, upwardly directed resilient tubes which are used to guide the hull as the boat is moved. The tubes are generally fixed, remaining substantially vertical at all times. U.S. Pat. No. 4,011,958, issued Mar. 15, 1977 to Carrick and U.S. Pat. No. 4,623,161, issued Nov. 18, 1986 to Sprague describe similar devices.

Boat trailer guiding devices have also been developed which include movable upwardly directed tubes or arms. Examples of such devices are disclosed in U.S. Pat. No. 4,529,217, issued July 16, 1985 to Wood and U.S. Pat. No. 3,447,815, issued June 3, 1969 to West. In each case, movement of the upwardly projecting arms (which act as guides) is from side to side. Devices of this design tend to remain substantially vertical at all times. The side to side motion of the guide arms usually requires the trailer to be some distance away from the dock to facilitate such movement.

SUMMARY OF THE INVENTION

A marker assembly according to the invention suitably comprises a mounting bracket and a position indicator. The position indicator includes a marker pole and a reservoir which may be filled with water through apertures provided thereon. Filling the reservoir causes the position indicator to rotate such that the pole marker becomes substantially erect, providing a visual indication of the position of an attached structure.

A marker assembly in accordance with one aspect of the present invention advantageously includes a submersible position indicating device having an elongated marker affixed to reservoir proximate one end thereof. The reservoir defines an internal chamber having a water inlet aperture and a discharge aperture which permit the chamber to be filled and later emptied. The marker assembly is first secured to a boat trailer on an existing support member. When the trailer is submerged in water, the chamber of the marker assembly fills with water through the inlet aperture causing the pole and marker combination to rotate upwardly towards the hull of a boat borne upon the trailer. After the boat is removed from the trailer and the trailer is removed from the water, the pole and marker become substantially erect, providing the operator with a visual indication of the position of the submerged trailer vis-a-vis a dock or similar structure as the operator backs the trailer into the water alongside the dock. When the boat is later replaced on the trailer, and the trailer removed from the water, water drains from the chamber through the discharge aperture. Movement of the structure is advantageously along the longitudinal axis of the trailer.

DETAILED DESCRIPTION OF THE DRAWINGS

FIG. 1 is a rear elevational view of a marker assembly in accordance with the present invention, here shown mounted to an associated trailer in an erect position, where the position of a boat is shown in phantom lines;

FIG. 2 is a partial perspective view of a trailer marker assembly according to the invention as shown in FIG. 1, with the boat removed;

FIG. 3 is a partial side elevational view of the trailer marker assembly shown in FIG. 1;

FIG. 4 is a partial, side elevational view, partly in section, of a trailer marker assembly according to the invention in a generally horizontal position;

FIG. 5 is a partial, side elevational view, partly in section, of the trailer marker assembly of FIG. 4, showing the reservoir as it is fills with water; and FIG. 6 is a partial, side elevational view, partly in section, of the trailer marker assembly of FIG. 4, showing the assembly in an erect position with the reservoir filled and removed from water.

DETAILED DESCRIPTION OF A PREFERRED EMBODIMENT

Referring to FIGS. 1 and 2, a marker assembly 14, according to an embodiment of the present invention, is releasably mounted to a horizontally extending support beam 16 of a boat trailer 12. FIGS. 1-3 illustrate the position marking assembly 14 in an upright position. When boat 10, illustrated in phantom lines, is placed on trailer 12, position marking assembly 14 would then assume a substantially horizontal orientation, as will be described below.

Referring specifically to FIG. 2, marker assembly 14 suitably comprises a mounting bracket assembly 18, and a rotatable position indicator 20. Mounting bracket assembly 18 suitably comprises a generally U-shaped bracket 22 having a horizontal wall 23 spanning a pair of opposed, long and short vertical walls 24, 26, an axle assembly 28 which is rigidly attached to and extends outwardly from vertical wall 24, and a stop 30, which extends parallel to axle assembly 28 at a spaced-apart position directly below axle 28. Axle assembly 28 and stop 30 each preferably extend perpendicularly from wall 24. Axle assembly 28 suitably includes a bolt 32 and a spacer sleeve 34, disposed over a portion of bolt 32 between wall 24 and position indicator 20. Spacer 34 has four equiangular triangular gussets 40, which may optionally be secured to vertical wall 24, and a tubular central sleeve 33. Bolt 32 has threaded end portions 61 at opposite ends thereof, which are threaded for mating engagement with associated nuts 60 (shown in FIG. 1), which retain position indicator 20 on bolt 32, as described hereafter.

Gussets 42 identical to gussets 40 may be associated with stop 30. Stop 30 further includes an end portion 36, disposed for engagement with position indicator 20.

Vertical wall 26 includes two apertures 44 threaded for mating engagement with a pair of set screws 46. Each screw 46 suitably includes a handle 48 disposed at an end portion of each screw 46, and a movable retaining foot (disk) 50 (shown in FIG. 1) mounted at its opposite end, between walls 24 and 26. Upon tightening screws 46, disks 50 clamp beam 16 securely between screws 46 and wall 24.

Position indicator 20 comprises an elongated marker pole 54 having a hollow reservoir (tank) 52 secured to one end thereof. Pole 54 preferably has suitable means for augmenting the visibility of pole 54, e.g., a banner 55 (shown in FIG. 3) affixed to the end of pole 54 remote from tank 52. Reservoir 52 is rotatably mounted on axle assembly 28 through a transverse aperture 56, centrally disposed in a laterally extending rounded lobe 58 of reservoir 52 which adjoins pole 54. Spacer 34 maintains a predetermined separation, e.g., three to four inches, between reservoir 52 and mounting bracket 18, which prevents bracket 18 from interfering with the operation of position indicator 20.

Reservoir 52 can pivot counterclockwise to engage stop 30 at a point immediately below lobe 58 to assume the erect position shown in FIG. 2. When position indicator 20 rotates clockwise, pole 54 comes into contact with a cross member 59 or similar retaining means on trailer 12, at which point the positional orientation of pole 54 becomes substantially horizontal.

Reservoir 52 has an internal chamber 62 of essentially triangular cross-section defined between a pair of side walls 64,66 which diverge from a common edge 67, and a back wall 68. A water inlet aperture 70 is disposed in an inclined portion of a top wall 72, and a drain aperture 74 is disposed at an upper portion 75 of back wall 68, i.e., just below lobe 58. Apertures 70 and 74 advantageously permit chamber 62 to be selectively filled and emptied. Inlet 70 is preferably positioned between pole 54 and drain hole 74 in the lengthwise direction of reservoir 52.

Referring to FIGS. 4 to 6, the operation of position marker assembly 14 will now be described. In FIGS. 4 to 6, phantom lines illustrate structure hidden from view. Marker assembly 14 is initially installed on horizontal support beam 16 substantially towards the rear of trailer 12 by means of mounting bracket 18. Installation is achieved by first sliding bracket 18 over a top wall 76 of horizontal support beam 16 until wall 76 (FIG. 1) rests against wall 23. Sets screws 46 are then tightened until each retaining disk 50 firmly engages support beam 16.

When marker assembly 14 is initially installed, chamber 62 is empty. When chamber 62 is empty, the weight of reservoir 52 to the side of bolt 32 opposite marker pole 54 is less than the combined weight of the remainder of position indicator 20. As a result, marker pole 54 is urged downwardly towards support beam 16, to rest, e.g., against cross member 59 of trailer 12 in an essentially horizontal position. Position indicator 20 would be oriented in this manner beneath boat 10 prior to the entry of boat trailer 12 into water as, for example, when boat 10 and boat trailer 12 are in transit.

When boat 10 and boat trailer 12 enter the water, reservoir 52 becomes submerged, causing water to enter chamber 62 through water inlet aperture 70, in the direction of the arrow shown in FIG. 5. Once boat 10 and trailer 12 are in proper position vis-a-vis a dock or similar structure, boat 10 is removed from trailer 12 by the operator. When chamber 62 is filled, the weight of marker assembly 14 to the side of bolt 32 opposite pole 54 is greater than the remainder of position indicator 20 once marker assembly 14 emerges from the water. After boat 10 has been removed from trailer 12 and the operator begins to draw trailer 12 out of the water, position indicator 20 rotates until marker pole 26 stands substantially erect, at which time the top portion thereof, including banner 55, is visible by the operator. Boat trailer 12 is then removed from the water and parked on shore while boat 10 is in use. When trailer 12 is removed from the water, water drains out of discharge aperture 74 until the water level within chamber 62 is substantially level with discharge aperture 74, as shown in FIG. 6. The extra weight of the water in reservoir 52 causes pole 54 to remain substantially erect.

Later, when boat 10 is to be retrieved from the water, trailer 12 is backed into proper position vis-a-vis a dock or similar structure. As may be recalled, upwardly projecting marker pole 54 is situated substantially towards the rear of trailer 12 on support beam 16. Thus, marker pole 54 provides a visual indication of the end of trailer 12. As trailer 12 is backed into the water, it again becomes submerged. As this occurs, pole 54, extending upwardly through the water, remains visible to the operator so that the operator is able to determine when boat trailer 12 has reached the desired position vis-a-vis the dock. At that time, marker pole 54 also provides a visual indication to the boat operator of the position of trailer 12 so that boat 10 may be easily positioned for retrieval from the water. As boat 10 is brought upon trailer 12, marker pole 54 comes into contact with the hull of boat 10, forcing position indicator 20 towards a substantially horizontal position, as shown in FIG. 4.

When position indicator 20 is in a horizontal position such that pole 54 abuts against beam 59 of trailer 12, back wall 68 and discharge aperture 74 are both downwardly directed. Once boat 10 has been properly positioned on trailer 12, and the operator removes trailer 12 and boat 10 from the water, water empties from within chamber 62 through discharge aperture 74. Once the water in chamber 62 has been substantially discharged through aperture 74, the weight of reservoir 52 to the side of bolt 32 opposite pole 54 once again becomes less than the weight of the remainder of position indicator 20. As a result, pole 54 will remain in a horizontal position. In this manner, no contact is made with the hull of boat 10 while boat 10 and trailer 12 are not in use.

A marker assembly according to the invention, such as described herein with respect to the preferred embodiment, advantageously provides an economical approach for easily adapting a boat trailer to include a means for providing a visual indication of the position of a submerged trailer. The invention further eliminates the need to pivot the marker manually, since the marker assembly according to the invention is actuated by the weight of water in the reservoir. Simplicity of design also results in lower manufacturing costs, and reduces the likelihood of failure during use due to the integrity of design. Additionally, because the marker assembly is stored under the boat when not in use, i.e., during periods when the trailer is in transit, there is less wind resistance than in conventional designs employing fixed markers (or guides).

While the invention has now been described with reference to certain preferred embodiments, those skilled in the art will appreciate the various substitutions, modifications, changes and omissions which may be made without departing from the spirit thereof. Accordingly, it is intended that the scope of the present invention not be limited by the foregoing description but be measured with regard to the claims which follow.

I claim:
1. A boat trailer marker assembly, comprising:
   a position indicator including an elongated pole and hollow reservoir secured to said pole proximate an end thereof, said reservoir having an internal chamber;

a support bracket having means for releasably securing said bracket to a boat trailer;

an axle fixedly secured to said bracket;

mounting means for pivotally securing said marker to said axle of said marker, said mounting means positioned to cause said pole to pivot downwardly when said reservoir is empty and said marker is in a non-submerged state, and to cause said pole to pivot upwardly once the reservoir is filled with water and said reservoir is in a non-submerged state;

discharge means for allowing water within such chamber to drain therefrom when said marker pivots on said axle to a horizontal position and said reservoir is in a non-submerged state; and inlet means for allowing water to enter and fill said chamber when said reservoir is submerged in water.

2. The device of claim 1, further comprising a stop secured to said bracket and positioned to limit counterclockwise movement of said position indicator such that said reservoir abuts against said stop when said position indicator is in a substantially vertical position.

3. The device of claim 2, wherein said stop extends from said bracket parallel to said axle.

4. The device of claim 1, wherein said mounting means comprises a hole extending transversely through said reservoir substantially directly beneath said pole, said axle extending through and beyond said hole, a spacer mounted on said axle between said bracket and said reservoir, and fastener means for securing said spacer and said reservoir on said axle.

5. A submersible position indicating device for a trailer to facilitate retrieving an object from a body of water, comprising:

a position indicator including an elongated pole and hollow reservoir secured to said pole proximate an end thereof, said reservoir having an internal chamber;

a support bracket having means for releasably securing said bracket to a trailer;

an axle fixedly secured to said bracket;

mounting means for pivotally securing said indicator to said axle, said mounting means positioned to cause said pole to pivot downwardly when said reservoir is empty and said indicator is in a non-submerged state, and to cause said pole to pivot upwardly once the reservoir is filled with water and said reservoir is in a non-submerged state;

discharge means for allowing water within such chamber to drain therefrom when said indicator pivots on said axle to a horizontal position and said reservoir is in a non-submerged state; and inlet means for allowing water to enter and fill said chamber when said reservoir is submerged in water.

6. The device of claim 5 wherein the object is a boat.

* * * * *